United States Patent [19]

Groppo

[11] Patent Number: 5,022,710
[45] Date of Patent: Jun. 11, 1991

[54] WHEEL COVER FOR MOTOR VEHICLES

[76] Inventor: Domenico Groppo, Regione Fornace 79, Ceresole d'Alba (Cueno), Italy

[21] Appl. No.: 509,472

[22] Filed: Apr. 12, 1990

Related U.S. Application Data

[63] Continuation-in-part of Ser. No. 308,310, Feb. 8, 1989, abandoned.

[30] Foreign Application Priority Data

Apr. 8, 1988 [IT] Italy ............................. 53049/88[U]

[51] Int. Cl.$^5$ .............................................. B60B 7/06
[52] U.S. Cl. .................................. 301/37 S; 301/37 R
[58] Field of Search ............ 301/37 R, 37 P, 37 CM, 301/37 S, 108 R, 108 S, 108 A

[56] References Cited

U.S. PATENT DOCUMENTS

| | | | |
|---|---|---|---|
| 2,037,470 | 4/1936 | Hunt | 301/37 S |
| 3,092,421 | 6/1963 | Lyon | 301/37 S |
| 3,356,421 | 12/1967 | Trevarrow, Jr. | 301/37 S |
| 3,367,721 | 2/1968 | Clare | 301/37 CM |
| 3,549,204 | 12/1970 | Spisak | 301/108 S X |
| 4,441,762 | 4/1984 | Segal | 301/37 P X |

FOREIGN PATENT DOCUMENTS

| | | | |
|---|---|---|---|
| 30003 | 1/1926 | France | 301/108 S |
| 30188 | 1/1926 | France | 301/108 S |
| 2548968 | 1/1985 | France | 301/37 R |
| 0102702 | 8/1980 | Japan | 301/37 S |

Primary Examiner—Russell D. Stormer
Attorney, Agent, or Firm—McGlew & Tuttle

[57] ABSTRACT

A wheel cover comprises a central portion and a peripheral portion mutually rotatable. The peripheral portion has a passage for a tire inflating valve; the central portion has seats for the wheel fastening bolts, which seats are so constructed as to allow the seat depth to be adapted to any distance between a plane of abutment of the wheel cover and a bolt fastening plane.

8 Claims, 4 Drawing Sheets

WHEEL COVER FOR MOTOR VEHICLES

CROSS REFERENCE TO RELATED APPLICATIONS

The present application is a continuation-in-part of application Ser. No. 308,310 filed Feb. 8, 1989 now abandoned.

FIELD OF THE INVENTION

The present invention concerns a wheel cover for motor vehicles, of the kind which is fastened by means of bolts.

BACKGROUND OF THE INVENTION

Many motor cars have wheel covers fastened by the same bolts fastening the wheels on the hub. These wheel covers comprise a body made of a single piece, which has on the edge an opening for the passage of the tire inflating valve and, in the central area, openings for the passage of the fastening bolts. Hence, for a given wheel diameter and for a given number of bolts, the known wheel covers may be employed only in conjunction with wheels having a given relative position of the valve and the bolts. Moreover, the bolt seats have a fixed depth, hence the wheel cover may be used only in conjunction with wheels having a predetermined distance between the bolt fastening plane and the plane of abutment of the wheel cover.

SUMMARY OF THE INVENTION

The invention provides a universal wheel cover, which may be used for wheels having any relative position of the bolts and the tire valve and any distance between the above-mentioned planes.

According to the invention, a wheel-cover is provided comprising a body consisting of two mutually rotatable portions, of which one (peripheral portion) has the passage for the valve and the other (central portion) has seats for the fastening bolts, and in that such seats are associated with adjustment means allowing their depths to be varied for matching the distance between the abutment plane of the wheel cover and the bolt fastening plane in a particular wheel.

The seat opening includes an inner surface with a set of step portions (preferably three sets of step portions) which extend from the inner surface in the direction of the center of the opening. Each step portion has an upper surface which, within each set of step portions, is at a different level. The inner surface of the seat opening also includes ribs which have substantially the same width as the width of an associated step. There are at least two sets of step portions (with associated grooves) within each of the seat openings. Preferably, three sets of steps are provided such that there will be three steps at the same level within each seat opening. Each of the cup-shaped seat bushings includes tongues which extend radially from an upper end of the seat bushing. The number of tongues corresponds to the number of sets of step portions (for example 3). The width of each tongue is substantially the same as the width of the step or the same as the distance between ribs. (The step width is sightly smaller than the groove width defined between associated ribs). The cup-shaped seat bushings may be positioned (from above) into the seat opening such that each of its tongues is disposed between two adjacent ribs. The cup-shaped seat bushing may then be allowed to drop downwardly until the tongue rests against the top surface of a step associated with the groove, that the tongue is positioned in. When the bolt is engaged with a stud, such that it is positioned within the bolt seat (bolt seat opening and bolt seat bushing), the entire structure is held securely with respect to the wheel.

Advantageously, the adjustment means comprises bushings mounted inside the bolt seats and provided with radial tongues which can rest against one of a plurality of steps, located at different levels and forming the surface directed toward the seat inlet, of protruding elements provided on the inner seat surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
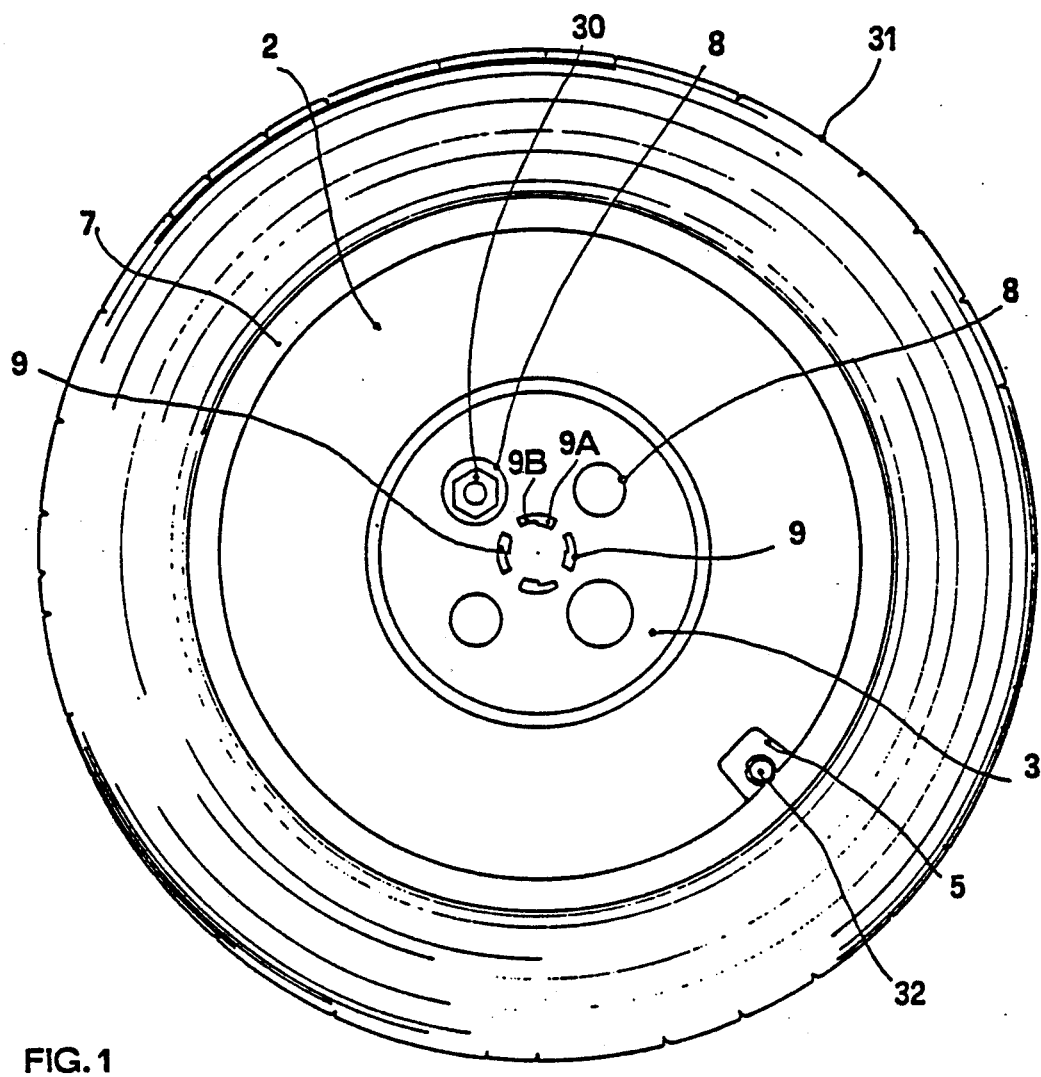
FIG. 1 is a front view of the invention, mounted on a wheel and with the covering element removed.

Referring to the drawings, in particular, the wheel cover of the invention consists of a body 1, fastened by bolts 30 to a vehicle wheel 31 and composed of a peripheral portion 2 and a central portion 3, rotatably joined to the peripheral portion 2.

Peripheral portion 2 is a hollow element with a substantially annular shape if viewed in plan and comprises a side wall 4 which may engage the rim of wheel 31. The base has a peripheral opening 5 through which tire valve 32 passes. Side wall 4 has, near the outer surface of the peripheral portion, openings 6 for air circulation. A radial flange projecting from the side wall 4 covers the rim edge.

The central opening of peripheral portion 2 has an edge 21 which is at a lower level than the outer surface of portion 2. The edge of central portion 3 rests on said edge 21. Central portion 3 has inward projecting teeth 22, which are forced against lowered edge 21 and prevent central portion 3 from disconnecting from the peripheral portion.

Central portion 3 has seat openings 8 for bolts 30 and openings 9 through which appendages 10 of a covering element 11 pass, which element, when the wheel cover is mounted on the wheel, hinders the access to bolt seat openings 8. As a result of the central portion 3 being rotatable with respect to peripheral portion 2, the wheel cover may be employed whatever the relative position of valve 32 and bolts 30 may be.

Figure 3:
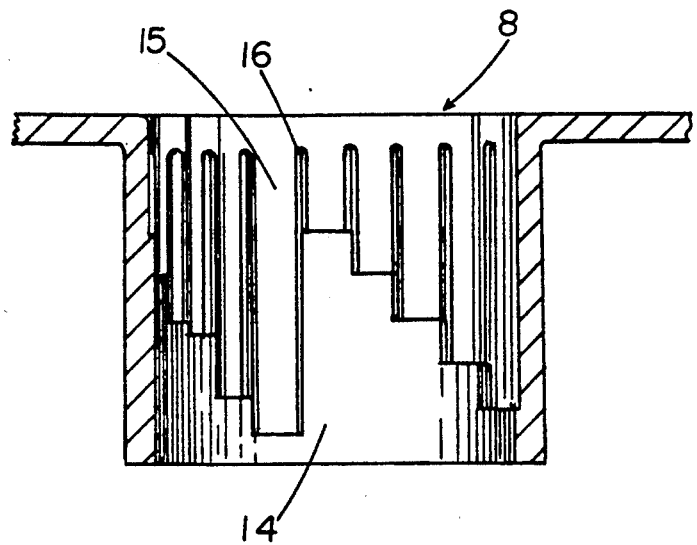
FIG. 3 is a cross-sectional view of a seat for a bolt.
Figure 6:
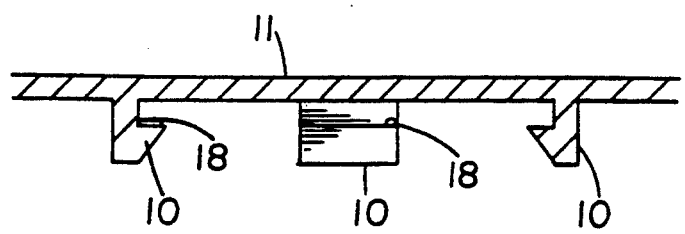
FIG. 6 is a cross-sectional view of the covering element with extending appendages.

Seat openings 8 project from the inner face of central portion 3 and have substantially the same height as side wall 4 of peripheral portion 2. To allow the wheel cover to be used in conjunction with wheels having different distances between the plane of abutment of the wheel cover and the bolt fastening plane, each seat opening 8 houses a seat bushing 12 having radial tongues 13. Each tongue rests on a protruding portion 14 of which the outward directed surface comprises a plurality of steps, as shown in FIG. 3. The lowermost step of a set of plurality of steps is substantially at the same level as the bottom of bolt seat opening 8 and the uppermost step is at a level slightly beneath the inlet of seat opening 8. Each seat opening 8 includes an inner surface with a set of step portions 14 (which extend from the inner surface in the direction of the center of the opening), each step portion having an upper surface which, within each set of step portions, is at a different level. The inner surface of the seat opening also includes ribs 16 which have substantially the same width (see FIG. 3) as the width of an associated step. There are at least two sets of step portions 14 (with associated grooves) within each of the seat openings 8. Preferably, three sets of steps 14 are provided such that there will be three steps at the same level within each seat opening 8. Each of the cup-shaped seat bushings 12 includes tongues which extend radially from an upper end of the seat bushings 12. As stated in the specification, the number of tongues 13 corresponds to the number of sets of step portions 14 (i.e. three). The width of each tongue is substantially the same as the width of the step or the distance between ribs 16 (the step width slightly smaller than the groove 15 defined between associated ribs 16).

The cup-shaped seat bushings 12 may be positioned (from above) into the seat openings 8 such that each of its tongues is disposed between two adjacent ribs 16 (within a groove 15). The cup-shaped seat bushing 12 may then be allowed to drop downwardly until the tongue rests against the top surface of a step associated with the groove that the tongue has been positioned in. The level is chosen in dependence upon the relationship between the peripheral portion 2 and the wheel which affects the relationship between the bolt seat and the wheel hub bolt holes. When the bolt is engaged with a stud such that it is positioned within the bolt seat (bolt seat opening and bolt seat bushing), the entire structure is held securely with respect to the wheel.

Figure 2:
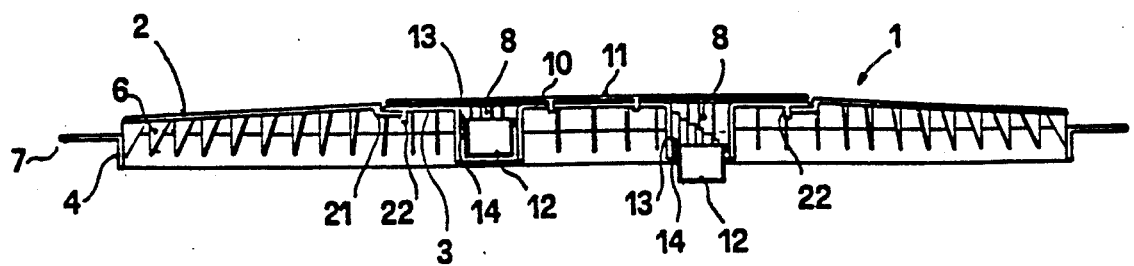
FIG. 2 is a cross-sectional view of the invention.

When the tongues 13 of the bushings rest against the uppermost steps of projections 14, seat bushings 12 are wholly housed within seat opening 8, as shown for the left-hand bushing in FIG. 2. By putting the tongues against one of the intermediate steps, the bushing will project to a greater or lesser extent from seat opening 8 (as shown for the right bush in FIG. 2) and, when the tongues rest on the lowermost step, substantially the whole bush will jut out of the seat. Thus, bolts 30 will be at the fastening plane level, whatever the distance between said plane and the plane of abutment of the wheel cover.

Figure 7:
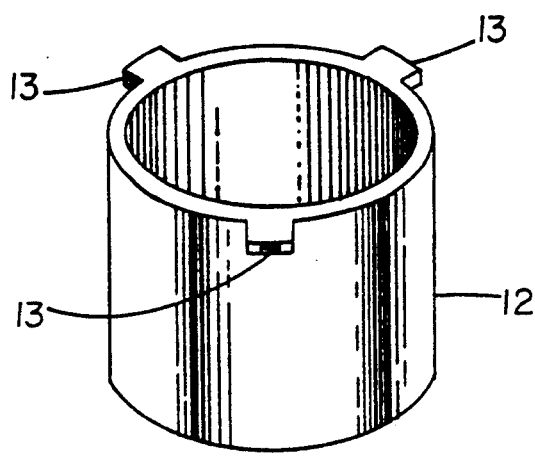
FIG. 7 is a perspective view of the seat bushing element.
Figure 5:
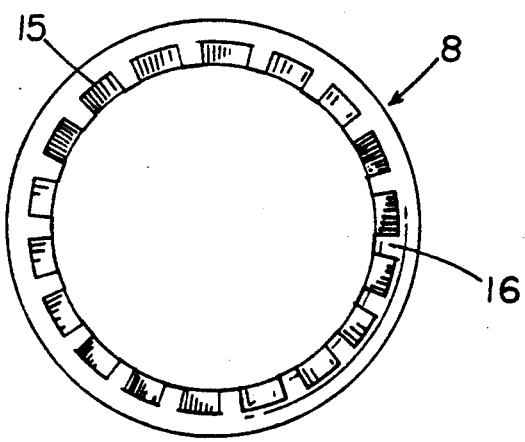
FIG. 5 is a top view of the seat for a bolt shown in FIG. 3.

The inner surface of seat opening 8 is partly smooth and partly grooved: namely the seat portion adjacent to the seat inlet (front portion, when the cover wheel is in place on the wheel) is grooved and the opposite portion (rear portion) is smooth (see FIG. 3). The grooves 15 are separated or defined by ribs 16, and in correspondence of the grooves the seat wall has reduced thickness (see FIGS. 3 and 7), whereas in correspondence with the ribs it may have the same thickness as the smooth portion. The grooves are arranged in groups (sets), two of them being indicated by X, Y in FIG. 3. The sets are as many as tongues 12 and the grooves in a group have different lengths. All groups are identical to each other, that is they comprise the same number of grooves and the grooves in a group are identical to those of the other groups. The grooves are open in correspondence of their front end (top end), whereas at the rear or bottom end they are closed by respective steps (15a in FIG. 3) separating the grooves from the smooth portion 14. Therefore, the boundary between the smooth portion and each group of grooves has the shape of a stair, as shown in FIG. 3. In the disclosed embodiment where the bushing 12 comprises three tongues, the smooth portion of the seat is therefore divided into three regions (one for each group of grooves) and each region corresponds to a "projection" 14.

When the bushing is inserted in the seat, the three tongues engage three grooves of equal length and abut against the respective step 15a. The ribs 16 prevent rotation of the bushing inside the seat and prevent the tongues from passing to another step of region 14. By that arrangement, depending on which groove a tongue has engaged, the bushing will more or less project from the seat outlet (i.e. it will more or less project towards the wheel body), and the cover can be fastened to any wheel, independently from the distance between the central part of the wheel body (against which the bolts are to be fastened), and the peripheral rim against which the cover (2,7) abuts.

To prevent tongues 13 from passing from a step to a lower one, the tongues will engage grooves 15 defined by ribs 16 provided in the surface of seat opening 8.

Said grooves and ribs extend from a respective step of projections 14 up to the inlet of seat opening 8.

There is at least a pair of tongues 13 in each bushing, and therefore at least a pair of projections 14 in each seat. Advantageously three tongues 13 and three projections 14 are provided.

Figure 4:
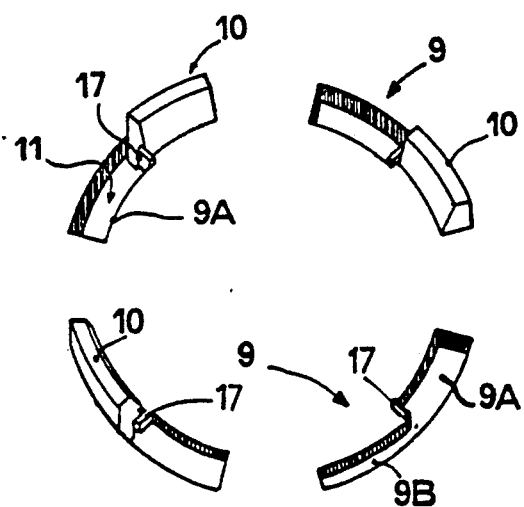
FIG. 4 is an enlarged view of a detail of the connection between the covering element and the central portion viewed from below the central portion.

FIG. 4 shows in greater detail the connection between covering element 11 and central portion 3 of the wheel cover.

Openings 9, for appendages 10 of the covering element 11, are divided into two parts 9A, 9B of different widths, and are provided, at the narrowing point between parts 9a and 9b, with a tooth 17 which projects downwardly from the inner face of central portion 3 (see FIG. 4). One appendage 10 and one tooth 17 are not shown in FIG. 4, for sake of clarity.

Appendages 10 of covering element 11 have a tooth 18 at their ends. When the covering element 11 is mounted on the body of the wheel cover, appendages 10 enter the wider portion 9A of the openings and, by a light pressure upwardly extending tooth 18 is brought below downwardly extending tooth 17, they can be shifted by a rotation to the narrower zone 9B, where they will be held by the engagement between the side surface of teeth 17, 18. A pressure disengaging the teeth from each other, followed by a rotation in the opposite direction, allows the covering element to be released for the removal.

While a specific embodiment of the invention has been shown and described in detail to illustrate the application of the principles of the invention, it will be understood that the invention may be embodied otherwise without departing from such principles.

What is claimed is:

1. A vehicle wheel cover, comprising:

a central wheel cover portion;

a peripheral wheel cover portion, connected coaxially with respect to said central portion for rotation about said central portion, said peripheral portion having a passage for a tire inflation valve;

a plurality of fastening bolt seats, each fastening bolt seat defining a fastening bolt plane; and adjustment means for adjustably positioning each fastening bolt seat for adjusting the position of each fastening bolt plane with respect to said central portion.

2. A vehicle wheel cover according to claim 1, wherein each fastening belt seat includes a seat opening formed in said central position, said adjustment means includes a set of step elements, each step element being disposed at different levels between a bottom of each seat opening and a top of each seat opening and seat bushings positionable within said seat openings, each seat bushing having radial tongues which rest on ones of said steps.

3. A vehicle wheel cover according to claim 2, wherein an uppermost of said step elements is positioned such that a seat bushing element is substantially entirely housed within said seat openings when a corresponding tongue is resting on said uppermost of said step elements, and a lowermost of said elements is positioned such that a bushing element is substantially entirely extending from said seat opening when a corresponding tongue is resting on said lowermost step.

4. A vehicle wheel cover according to claim 2, wherein each seat opening includes at least two sets of step portions.

5. A vehicle wheel cover according to claim 2, wherein said seat openings include grooved surfaces extending from each step to an inlet end of each seat opening, said tongues having an edge engaged by said grooves, thereby preventing rotational movement of said seat bushings to prevent said tongues from moving from one step to a lower step of said step portions.

6. A vehicle wheel cover according to claim 1, further comprising a covering element mountable on said central portion to cover said bolt seat openings.

7. A vehicle wheel cover according to claim 6, wherein said central portion includes openings, said covering element including teeth adapted to enter said openings and resiliently engage edges of said openings.

8. A vehicle wheel cover, comprising:

a central portion;

a peripheral portion connected coaxially with the said central portion for rotation about said central portion, said peripheral portion including an opening for a tire inflation valve;

fastening bolt seats including fastening bolt seat openings defined by said central portion and fastening seat bushing elements, positionable within said fastening seat openings; and adjustment means for adjustably positioning said fastening seat bushing elements with respect to said fastening seat openings.

* * * * *